United States Patent
Oye et al.

(10) Patent No.: US 11,930,095 B2
(45) Date of Patent: Mar. 12, 2024

(54) SYSTEMS AND METHODS FOR CREATING AND MANAGING DYNAMIC CONTENT

(71) Applicants: Atlassian Pty Ltd., Sydney (AU); Atlassian Inc., San Francisco, CA (US)

(72) Inventors: Phil Oye, Sydney (AU); Artur Pawel Bodera, Mosman (AU); Sherif Mansour, Sydney (AU)

(73) Assignees: ATLASSIAN PTY LTD., Sydney (AU); ATLASSIAN US, INC., San Francisco, CA (US)

(\*) Notice: Subject to any disclaimer, the term of this patent is extended or adjusted under 35 U.S.C. 154(b) by 0 days.

(21) Appl. No.: 17/856,671

(22) Filed: Jul. 1, 2022

(65) Prior Publication Data

US 2022/0337678 A1   Oct. 20, 2022

Related U.S. Application Data

(63) Continuation of application No. 17/393,926, filed on Aug. 4, 2021, now Pat. No. 11,381,661, which is a continuation of application No. 16/831,556, filed on Mar. 26, 2020, now Pat. No. 11,095,754.

(60) Provisional application No. 62/825,889, filed on Mar. 29, 2019.

(51) Int. Cl.
*H04L 67/63*   (2022.01)
*H04L 9/40*    (2022.01)
*H04L 67/02*   (2022.01)

(52) U.S. Cl.
CPC ............ *H04L 67/63* (2022.05); *H04L 63/062* (2013.01); *H04L 63/08* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,408,296 B1 * | 6/2002 | Acharya | H04L 61/00 707/E17.115 |
| 7,538,685 B1 * | 5/2009 | Cooper | H04M 1/724 340/692 |
| 8,607,306 B1 * | 12/2013 | Bridge | H04L 67/02 726/1 |
| 2002/0002688 A1 | 1/2002 | Gregg | |
| 2005/0078944 A1 | 4/2005 | Risan | |
| 2006/0230286 A1 | 10/2006 | Kitada et al. | |
| 2010/0319059 A1 * | 12/2010 | Agarwal | H04L 9/321 726/7 |
| 2012/0030212 A1 * | 2/2012 | Koopmans | H04N 21/21 707/741 |

(Continued)

*Primary Examiner* — James A Edwards
(74) *Attorney, Agent, or Firm* — Brownstein Hyatt Farber Schreck, LLP

(57) ABSTRACT

A method for creating a dynamic element in content performed by a dynamic element management system is disclosed. The method includes receiving a content request for the dynamic element from a client device, the content request comprising a uniform resource locator (URL) of an external data source from which to retrieve content for the dynamic element; identifying the data source based on the URL; forwarding the content request to the identified data source; receiving metadata corresponding to the content hosted by the data source; and forwarding the metadata to the client device for display in a dynamic element placeholder on the client device.

20 Claims, 9 Drawing Sheets

(56) References Cited

U.S. PATENT DOCUMENTS

| | | | |
|---|---|---|---|
| 2012/0079578 A1* | 3/2012 | Dachiraju | H04N 21/8549 726/26 |
| 2012/0310775 A1 | 12/2012 | Laster-Fields et al. | |
| 2013/0090976 A1* | 4/2013 | White | G06Q 10/20 705/7.27 |
| 2013/0179736 A1* | 7/2013 | Gschwind | G06F 11/3006 714/E11.029 |
| 2013/0346475 A1* | 12/2013 | Jasperson | H04L 67/142 709/203 |
| 2014/0108901 A1* | 4/2014 | Carriero | G06F 16/9562 715/206 |
| 2016/0044279 A1* | 2/2016 | Block | H04L 65/1069 348/14.09 |
| 2017/0235490 A1 | 8/2017 | Tan et al. | |
| 2017/0289073 A1 | 10/2017 | Crusson et al. | |
| 2018/0013758 A1 | 1/2018 | Yu et al. | |
| 2019/0174187 A1* | 6/2019 | Casey | H04N 21/26613 |

* cited by examiner

900

SYSTEMS AND METHODS FOR CREATING AND MANAGING DYNAMIC CONTENT

CROSS-REFERENCE TO RELATED APPLICATION(S)

This application is a continuation patent application of U.S. patent application Ser. No. 17/393,926, filed Aug. 4, 2021 and titled "Systems and Methods for Creating and Managing Dynamic Content," which is a continuation patent application of U.S. patent application Ser. No. 16/831,556, filed Mar. 26, 2020 and titled "Systems and Methods for Creating and Managing Dynamic Content," now U.S. Pat. No. 11,095,754, which is a nonprovisional patent application of and claims the benefit of U.S. Provisional Patent Application No. 62/825,889, filed Mar. 29, 2019 and titled "Systems and Methods for Creating and Managing Dynamic Content," the disclosures of which are hereby incorporated herein by reference in their entireties.

FIELD

Aspects of the present disclosure are directed to the creation and/or management of dynamic content in electronic content.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Organizations typically create and/or manage large quantities of electronic content. Creation and management of this electronic content can usually be cumbersome, time consuming, and burdensome on network bandwidth. Oftentimes users create content (such as data tables, documents, posts, comments, blogs, etc.) that includes data that is available on a different platform/website, etc. For example, consider a data table created to summarize a list of service tickets currently pending in an issue tracking system such as Jira or a table summarizing the financial performance of a project/team. The underlying data required for these tables is available e.g., on the issue tracking system platform or in a finance application. Every time the table is created, the underlying data has to be retrieved from the external platform or application either manually or by writing and executing some sort of Marco. It may be simple to create one table in this manner, but this problem is exacerbated when organizations have multiple tables/documents/posts/blogs/website pages which reference one or more details that need to be updated from an external source.

Further, in other cases, the underlying data may be dynamic—e.g., service tickets that are currently pending may be completed in the near future and new service tickets may be created, the build status for a software code may change, weekly employee schedules can vary, the stock price of an entity varies daily, etc. Typically, in these cases, a user has to check the value of the corresponding data items (e.g., from the original content) before entering this value into their content. This fact checking exercise can often be frustrating and time consuming, and in some cases even in spite of the checking, the data can become outdated very quickly.

SUMMARY

The appended claims may serve as a summary of the invention.

BRIEF DESCRIPTION OF THE DRAWINGS

In the drawings:

FIG. 4A depicts the flowchart for the method up to a determination of whether an access key is present and FIG. 4B depicts the flowchart after it is determined that the access key is present.

Figure 1:
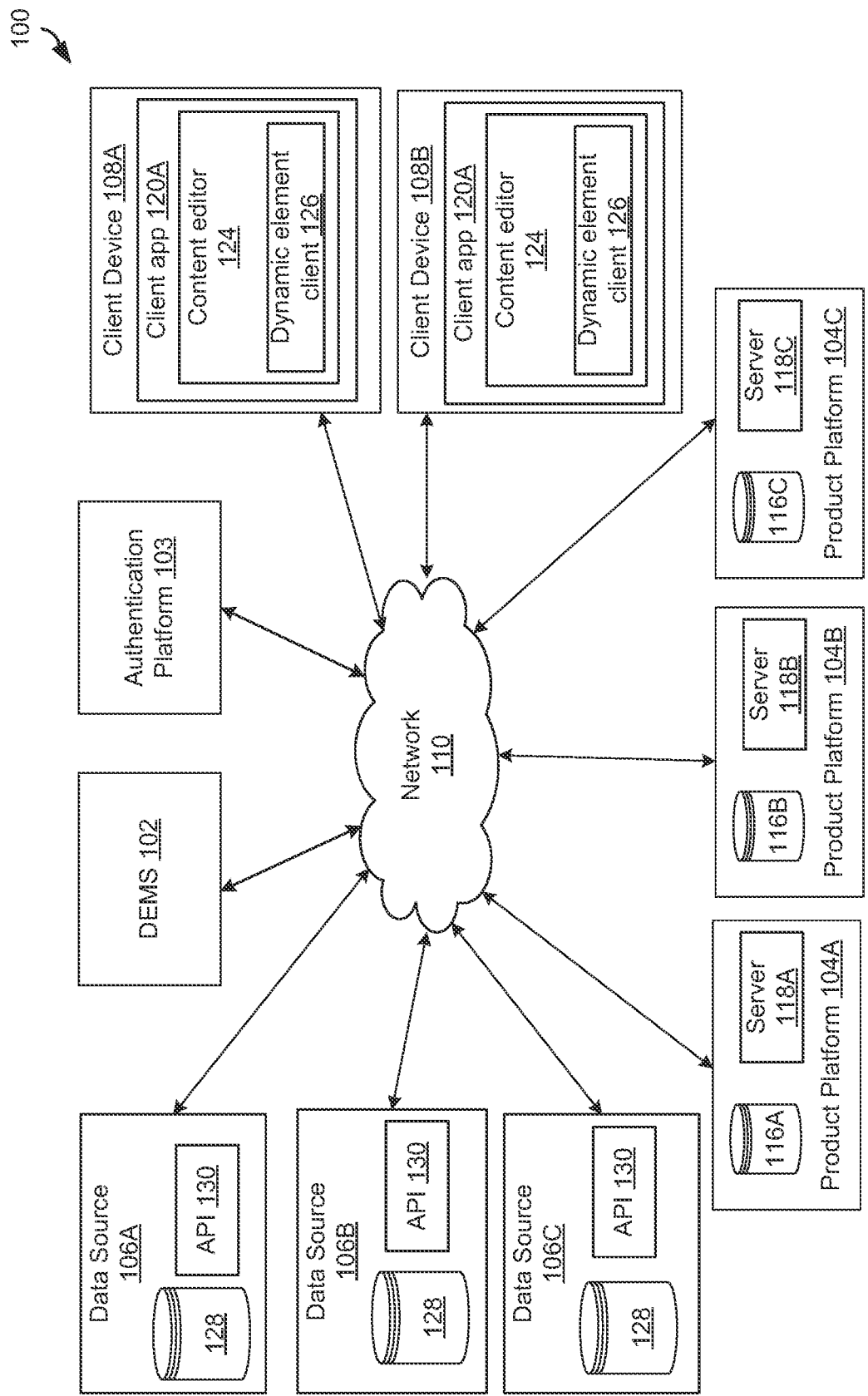
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described previously, organizations may create large amounts of content (webpages, issues, conversations, etc.). In many cases, this content can contain outdated data, which may be manually updated or if overlooked, remain outdated. In other cases, when creating content, users may wish to include data that they don't readily have access to or cannot remember.

To address one of more of these issues, embodiments of the present disclosure introduce dynamic elements that allow users to insert and/or edit data directly in their content from an external source. In particular, when a user wishes to insert data into their content that is available at a particular external source, the user can simply enter the location of the data they wish to insert (e.g., by entering a uniform resource locator (URL)) directly into the content, e.g., via a content editor, and embodiments of the present disclosure replace the URL with one or more data items from the external source referenced by the URL. If more than one data item is available at the external source, a drop-down menu or the like may be displayed with the available data fields and the user may be able to select a particular data field/data item from the drop-down menu.

Once a dynamic element is inserted in the content in this manner, the creator of the dynamic element may choose to freeze the value of the data item displayed in the dynamic element such that the value of the data item corresponding to the time at which the dynamic element was created is displayed each time the content is accessed. In other cases, the creator may allow the value of the dynamic element to the dynamically refreshed whenever the underlying value changes. This way, whenever the content is accessed, the dynamic element present in the content can be refreshed to display the current value of the data item represented by the dynamic element.

These and other aspects of the present disclosure will be described in detail with reference to FIGS. 1-13 below.

Environment Overview

FIG. 1 illustrates an environment 100 in which one or more aspects of the present disclosure are implemented. Specifically, FIG. 1 illustrates the systems involved in creating, and managing dynamic elements. The systems include a dynamic element management system (comprising server-side components referred to as a dynamic element management server (DEMS) 102 and an authentication platform 103 and a client-side component referred to as a dynamic element client 126), product platforms (e.g., product platforms 104A, 104B and 104C, collectively referred to as product platforms 104), data sources (e.g., data sources 106A, 106B, and 106C, collectively referred to as data sources 106), and client devices (e.g., client devices 108A, 108B, and 108C, collectively referred to as client devices 108). The DEMS 102, product platforms 104, data sources 106, and client devices 108 communicate with each other over one or more communication networks 110.

The DEMS 102 is configured to receive and service requests for dynamic elements. In particular, it is configured to communicate with the product platforms 104 to service requests for adding or viewing dynamic elements and with the data sources 106 to receive data for the dynamic elements.

In case the dynamic element is requested for restricted content, the DEMS 102 interacts with the authentication platform 103 to enable authorization of the user and retrieve permission to access the restricted content hosted on the data sources 106. In order to perform these functions, the DEMS 102 and the authentication platform 103 include a number of subsystems and modules, which will be described in detail with respect to FIG. 2.

In general, each product platform 104 is a system entity that hosts one or more software applications and/or content. Each platform 104 may include one or more servers (e.g., 118A, 118B and 118C) for hosting corresponding software application(s) and one or more storage devices (e.g., storage devices 116A, 116B and 116C) for storing application specific data. Examples of software applications hosted by product platforms 104 may include interactive chat applications (e.g., Slack™, Stride™), collaborative applications (e.g., Confluence™), software code management system (e.g., Bitbucket™), and issue tracking applications (e.g., Jira™). Jira, Confluence, BitBucket, and Stride are all offered by Atlassian, Inc. It will be appreciated that the software applications need not be offered by the same organization and that the presently disclosed invention can be used with any product platform such as Google Docs, Apache OpenOffice, configured to interact with the DEMS 102.

In order to run a particular application, the server 118 includes one or more application programs, libraries, APIs or other software elements that implement the features and functions of the application. In one example the product server 118 includes a content rendering module (not shown) which provides content rendering functionality as described in detail below.

The product platforms 104 also store product data. Product data generally includes: data defining the operation of the hosted application (for example, user accounts, user permissions, and the like); and application data (i.e., the content hosted/maintained by the application, which can be, for example, issue data (in Jira), page/document data (in Confluence), conversation and chatroom history (in HipChat and Stride), etc.). The data is stored on and managed by database 116. Database 116 is provided by a database server which may be hosted by server 118, but is more typically hosted on a separate physical computer in communication (directly or indirectly via one or more networks) with the server 118.

While single server architecture has been described herein, it will be appreciated that one or more of the product platforms 104 can be implemented using alternative architectures. For example, in certain cases a clustered architecture may be used where multiple server computing instances (or nodes) are instantiated to meet system demand Conversely, in the case of small enterprises with relatively simple requirements a product platform 104 may be a stand-alone implementation (i.e. a single computer directly accessed/used by the end user).

The data sources 106 host content and make this content available to one or more users on client devices 108. In the present disclosure, the DEMS 102 is configured to retrieve content for dynamic elements from the data sources 106. The data sources may be external data sources (i.e., hosted by third parties) or internal sources (i.e., hosted by organizations that provide the product platforms, or organizations that use the product platforms). Examples of external data sources may include systems that host the latest weather data, stock prices, movie reviews, song lyrics, memes, etc. Examples of internal data sources may include employee databases, finance spreadsheets, team structure databases, etc.

The data sources 106 include an API module 130 via which the DEMS 102 can communicate with the data sources and in particular may requests for content and/or provide instructions to perform actions on the content. Some data sources 106 may be publically accessible—i.e., the information available at the data sources 106 may be available for anybody to view. Alternatively, some data sources 106 may store at least some private/sensitive information that is restricted to certain individuals/teams, etc. In case the data sources host private/sensitive information, the data sources may also include an authorization service (not shown) that may be utilized to grant permission to the DEMS to perform actions and retrieve content on behalf of users. This authorization service may communicate with the authentication platform 103 to grant permissions when the DEMS polls the data source 106 to retrieve data for a particular dynamic element. In addition to the authorization service, the data source may also include a permissions database 128, which stores information about the permissions granted by the data source to one or more entities (including the dynamic element management system) to view and retrieve data on behalf of data source users.

Client devices 108 may be any device suitable for performing client-side operations described herein, for example a mobile device (e.g. a tablet or mobile phone), a portable device (such as laptop computer), or any other computing device (e.g. a desktop computer).

Generally speaking, users of client devices 108 are associated with one or more user accounts and generate and/or view electronic content on one or more product platforms 104. This activity includes any type of user account interaction with the product platforms 104, including interaction with content and/or software applications hosted by the product platforms 104. Example interactions include accessing/viewing and/or contributing to one or more documents hosted by the product platforms, writing posts, commenting on content, visiting web pages, sharing, liking, or viewing content, communicating with user accounts in real-time chat interfaces, etc.

In order to allow users to perform these functions, as illustrated in FIG. 1, each client device 108 includes one or more client (software) applications (e.g., client applications 120A and 120B) that are configured to access software applications made available by product platforms 104. In some cases, the client devices 108 may include a client application corresponding to each product platform 104 the client device 108 has access to. In other cases, a single client application (e.g., a web browser) may be utilized to communicate with multiple product platforms.

The client applications 120 include instructions and data stored in the memory (e.g. non-transient compute readable media) of the client devices 108 on which the applications are installed/run. These instructions are executed by a processor of the client device 108 to perform various functions as described herein. By way of example, some functions performed by the client applications 120 include communicating with applications hosted by the product platforms 106, rendering user interfaces based on instructions received from those applications, receiving inputs from user to interact with content hosted by product platforms 104.

The client application 120 may be implemented in various ways. For example, the client applications may be web browser applications (such as, for example, Chrome, Safari, Internet Explorer, Opera) which access the applications hosted by the product platforms 106 and/or DEMS 102 via appropriate uniform resource locators (URL) and communicate with these systems via general world-wide-web protocols (e.g. HTTP, HTTPS, FTP). In this case the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 106 and/or DEMS 102 using defined application programming interface (API) calls.

The client applications 120 include content editors 124, i.e., interfaces for allowing users to create content, such as webpages, issues, conversations, posts, comments, etc. In some cases, content editors 124 may use an iframe element for the content creation area. When a user clicks in the iframe, they can enter text, images or any other content in the iframe and once the user is done, they can submit the text so that the particular user interface currently displayed can be updated with the content submitted by the user. When the product platforms offers word processing or spreadsheet functionality, the content editors 124 may utilize the entire displayed user interface to receive user inputs.

According to the present disclosure, the content editor 124 includes a dynamic element client 126, which is configured to detect when a user enters a reference to an external resource (e.g., a URL) in the content editor 124, generate and render a dynamic element, communicate a request for data for the dynamic element to the DEMS 102, retrieve data for the dynamic element from the DEMS 102, and populate the dynamic element with the retrieved data. In case multiple data fields or data items are retrieved from the DEMS 102, the dynamic element client 126 may also be configured to allow the user to select one or more data items the user wishes to insert in the content. In addition, the dynamic element client 126 may be configured to provide options to freeze the data items, and/or aid in authentication of a user if the dynamic element includes restricted content.

As illustrated in FIG. 1, communications between the DEMS 102, authentication platform 103, client devices 108, product platforms 104, and data sources 106 are via the communications network 110. The communication network 110 is depicted as a single network in FIG. 1 for ease of depiction. However, in actual implementation, the various systems illustrated in FIG. 1 may communicate with each other over different communication networks. For example, the DEMS 102 may communicate with the authentication platform 103, product platforms 104 and internal data sources through a local area network (LAN), whereas it may communicate with the client devices 108 and external data sources via a public network (e.g., the Internet). Similarly, the product platforms 104 may communication with one or more client devices 108 via a LAN and with other client devices 108 via a public network without departing from the scope of the present disclosure. Furthermore, the DEMS 102, authentication platform 103, product platforms 104 and data sources 106 may communicate with each other over open web protocols such as (HTTPS, REST, and JWT).

It will be appreciated that although only two client devices (108A and 108B), three product platforms (104A, 104B and 104C) and three data sources (106A, 106B, and 106C) have been depicted, in normal operation, many more client devices 108, data sources 106 and product platforms 104 may be connected to the identity platform through the network 110. Furthermore, it will be appreciated that in some cases users may wish to insert data items from content hosted on one or more product platforms 104 and in such cases the product platforms 104 are also the data sources 106 for the data items.

System Architecture

Figure 2:
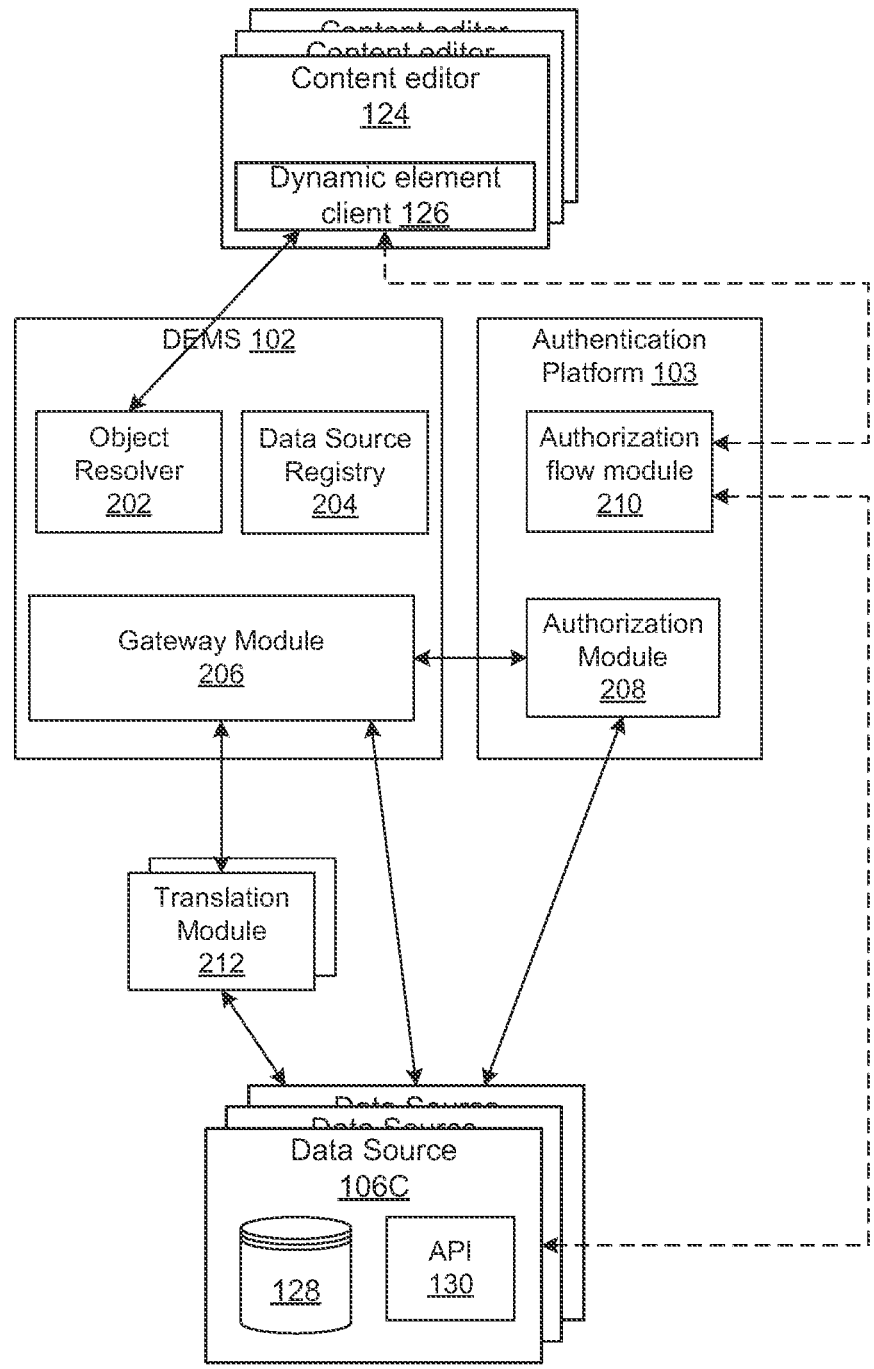
FIG. 2 is a block diagram of a dynamic element management system according to various embodiments of the present disclosure.

FIG. 2 illustrates the subsystems and modules of the DEMS 102 and the authentication platform 103. In general, the DEMS 102 includes an object resolver 202, a data source registry 204, and a gateway module 206. The authentication platform 103 includes an authorization module 208 and an authorization flow module 210. In addition, FIG. 2 illustrates that the content editors 124 and the dynamic element client applications 126 communicate with the DEMS 102 via the object resolver 202 and with the authentication platform 103 via the authorization flow module 210. Similarly, the data sources 106 are in communication with the gateway module 206 of the DEMS 102 and with the authorization module 208 of the authentication platform 103.

Generally speaking, data sources 106 maintain their content in many different ways. For example, some data sources may store content in a fragmented manner; other data sources may store their data in an unstructured format; whereas still other data sources may store their data in a structured format. Even within these different methodologies, the data sources 106 may utilize different standards, languages, or schemas for storing their content. The DEMS 102 however is configured to consume data in a particular format. To account for this, one or more data sources 106 (e.g., the data sources that do not store their data in the same format as that used by the DEMS 102) may further be associated with their respective translation modules 212. A translation module 212 is a stateless service that communicates with the DEMS 102 and its respective data source 106 and translates the communications between these entities into languages/formats that are understandable to the respective entities. For example, the translation module 212 associated with a particular data source 106 may be configured to receive content requests from the DEMS 102 and forward these requests to the data source 106 (e.g., in a language understood by the data source). It may also be configured to receive responses (including content and error messages) from the data source 106 and forward these to the DEMS 102 (e.g., in a language understood by the DEMS 102).

In certain embodiments, the DEMS 102 is configured to receive content from the data sources in a structured format and preferably using the JavaScript Object Notation for Linked Data (JSON-LD) schema. In these embodiments, the translation module 212 is configured to retrieve content from its respective data source and convert this into a JSON-LD file and forward it to the DEMS 102.

The object resolver 202 is configured to communicate with the content editors 124 to receive dynamic element requests and service these requests. In particular, the object resolver 202 is configured to resolve a URL to determine whether the DEMS 102 supports the data source 106 from which content is to be retrieved.

The data source registry 204 maintains a list of data sources 106 that are supported by the DEMS 102. In certain embodiments, the registry 204 maintains descriptors of third party data sources 106 that have agreed to provide content via dynamic elements.

In certain embodiments, the data sources 106 can communicate with the DEMS 102 to register their platforms for dynamic elements. In this case, the DEMS 102 may provide an interface to the data source 106 to provide information for storing in the data source registry 204. The DEMS 102 records the information in the form of a data source descriptor in one or more data structures. Each descriptor may store relevant information for retrieving content from the data source 106.

For example, for a unique data source descriptor, the DEMS 102 may store the following information:

Identifier (ID): that uniquely identifies the data source.

Data source name the name of the application or service—e.g., Google Spreadsheets, Asana, Trello dashboards, Jira Service Desk, etc.

Domain name(s): one or more domain names associated with the data source.

Restricted flag: a flag that indicates whether the data source is a restricted data source or not. As referred to herein, a restricted data source is a data source that includes content that is restricted to one or more users and not available publically. Examples of restricted data sources include web collaborative document management systems such as those offered by Google Spreadsheets® and Dropbox®, and collaborative management systems such as those offered by Asana® and Trello®. It will be appreciated that not all content available on a restricted data source is restricted. In fact, restricted data sources may also host content that is available publically. Public data sources on the other hand store only publically available content. Examples of public data sources include Wikipedia®, Webster dictionary, etc. Even if a data source may offer some publically available content, if restricted content is also hosted on the data source, this flag is selected.

A resolve URL: this is the location that can be addressed by the DEMS 102 to submit content requests. In case the data source is associated with a translation module 212, this URL points to the translation module 212. Otherwise, it may point to an API of the data source which can service content requests.

A container ID: This is a unique identifier for a container assigned to the data source by the authentication platform 103 in which configuration information for authenticating users may be stored. It will be appreciated that this field is used for restricted data sources and may not be used for public data source. In certain implementations, the container ID is assigned by the authentication platform 103 or the DEMS 103 when the data source descriptor is created.

The data structures and fields described are provided by way of example. Depending on the implementation, additional, fewer, or alternative fields may be used. Further, the fields described in respect of a given data structure may be stored in one or more alternative data structures (e.g. across multiple linked data structures). Further still, although tables are used to illustrate the data structures, the relevant fields/information may be stored in any appropriate format/structure.

The gateway module 206 is typically in communication with subsystems of the DEMS (such as the object resolver 202 and the data source registry 204) and with the subsystems of the authentication platform 103. It is also configured to communicate with third party data sources 106. In particular, the communications between the gateway module 206 and the object resolver 204 include receiving and servicing content requests. The gateway module 206 communicates with the data source registry 204 and the authentication platform 103 to retrieve access keys for requesting restricted content from data sources 106. Finally, it communicates with the data sources 106 to retrieve content.

The authorization module 208 is configured to communicate with the data sources 106 to receive permission for accessing user content from the data sources on behalf of the users. It is also configured to store the permissions granted to the DEMS 102 to retrieve restricted content from the data sources 106 on behalf of users. In particular, it stores access keys (e.g., tokens or passwords) that may be used to retrieve content from the data sources. Typically, an access key uniquely identifies a particular user, a particular party requesting access on behalf of the user (DEMS 102 in this case), and/or what permissions the user has agreed to give to the requesting party. When a user first requests a dynamic element to be added or requests to view a dynamic element associated with restricted content, the user is requested to log-in to their account maintained by the data source 106 and consent to the DEMS 102 contacting the third party data source on their behalf to retrieve restricted content from the data source 106 that the user has access to. When the user does this, an authorization server (not shown) associated with the data source 106 generates an access key that indicates that the DEMS 102 is authorized to retrieve content from the data source 106 (that the user has access to) on behalf of the user. This access key is stored by the authorization module 208 against the user ID.

In certain embodiments, the authorization module 208 maintains containers for each data source 106 it supports—each container uniquely identified by a container ID. Further, each container includes authentication information pertaining to the particular data source it is associated with.

For example, in a unique data source container, the DEMS 102 may store the following information:
- A client ID: that uniquely identifies the entity requesting authorization on behalf of the user. In this case, the client ID is the ID of the DEMS 102.
- A secret: is a passphrase or a secret known only to the entity requesting authorization on behalf of a user and the authorization server of the data source. This is typically stored in an encrypted or hash form.
- User IDs: this is a list of user ID of users of the DEMS 102 or the product platforms 104 that have authorized the DEMS 102 to retrieve content from the data source on their behalf.
- Authorization URL: this is the URL of the data source's authorization server to which the client device 108 has to be redirected so that the user can be authenticated and can consent to authorizing the DEMS 102 to retrieve content on its behalf.
- Exchange URL: Once the user provides consent, the authorization server of the data source generated a one-time token/code. The authorization module 208 has to then exchange this one time token/code for an access key. The exchange URL is the URL of the data source's authorization server which the authorization module has to contact to retrieve the access key.
- Profile URL: this URL points of the location in the data source server where the user's profile information can be retrieved. This is useful in case a user maintains multiple accounts with the data source and wishes to authorize the DEMS 102 to retrieve content from the data source associated with multiple accounts maintained by the user with the data source.

The permissions database 128 of the data source 106 also stores a copy of the access keys it has generated and assigned to different entity and user account pairs.

A user may modify/cancel these permissions at any time. If this happens, the corresponding data source 106 and the authorization module 208 are configured to delete the access keys. Further, the access keys may expire after a given time. In this case, the authorization module 208 may request the data source to reissue a new access key. In one example, the access keys may be generated and handled according to an authorization protocol such as the OAuth 2.0 protocol.

The authorization flow module 210 allows a user to authorize DEMS 102 to retrieve content from data sources on behalf of the user. When authorization is required (e.g., because DEMS 102 does not have permission to retrieve content on behalf of the user), the dynamic element client 126 communicates with the authorization flow module 210, which in turn redirects the user to the data source's authentication web page (hosted on the authorization URL), where the user can login (if required) and consent to giving DEMS 102 the permissions to access content. When the user is authenticated and has consented, the data source generates a one-time code/token, which is forwarded back to the authorization flow module 210. The authorization flow module 210 in turn provides this token to the authorization module 208, which exchanges this token for an access key from the data source 106.

Hardware Overview

The operations/techniques described herein are implemented by one or more special-purpose computing systems or devices. For example, in environment 100: the DEMS 102 may be provided by one or more computer systems; the authentication platform 103 may be provided by one or more computer systems; each product platform 104 may be provided by one or more computer systems; each client device 108 is a computer system; and each of the data sources 106 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 3:
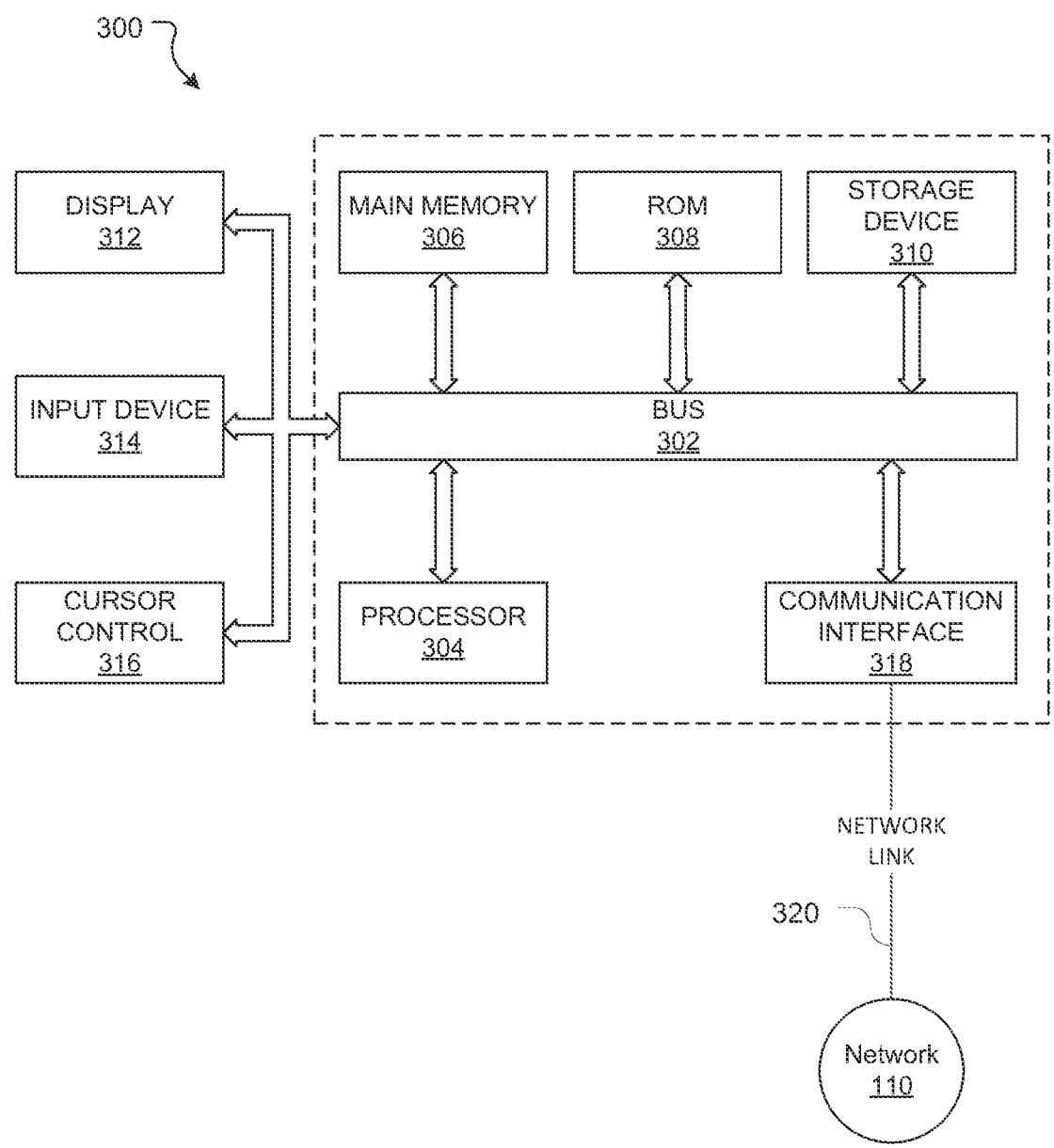
FIG. 3 is a block diagram of a computing system with which various embodiments of the present disclosure may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 210, such as a magnetic disk or optical disk, is provided and coupled to bus 302 for storing information and instructions. If the computer system 300 is part of the DEMS 102, the storage device 310 may store the data store registry 204.

In case the computer system 300 is the client device 108, it may be coupled via bus 302 to one more output devices such as a display 312 for displaying information to a computer user. Display 312 may, for example, be a cathode ray tube (CRT), a liquid crystal display (LCD), a light emitting diode (LED display), or a touch screen display. An input device 314, including alphanumeric and other keys, may be coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to network 110. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks 110 to other computing systems. For example, if the computing system 300 is part of the DEMS 102, the network link 320 may provide a connection through network 110 to client devices 108, data sources 106 or product platforms 104.

Computer system 300 can send messages and receive data, including program code, through the network(s), network link 320 and communication interface 318. In the DEMS example, the object resolver 202 may receive dynamic element requests from the product platform 106A through the network 110 and communication interface 318.

Exemplary Methods

This section describes various methods and processes for creating and viewing dynamic elements. Generally speaking, the process for viewing and creating dynamic elements is similar. In one case the content editor 124 detects a URL typed in the content editor 124 whereas in the other case a product platform viewer identifies a URL/dynamic element placeholder in the content being viewed. From that point, the processes for creation and viewing are similar and therefore only one process—i.e., a process for inserting a dynamic element is described here.

Figure 4A:
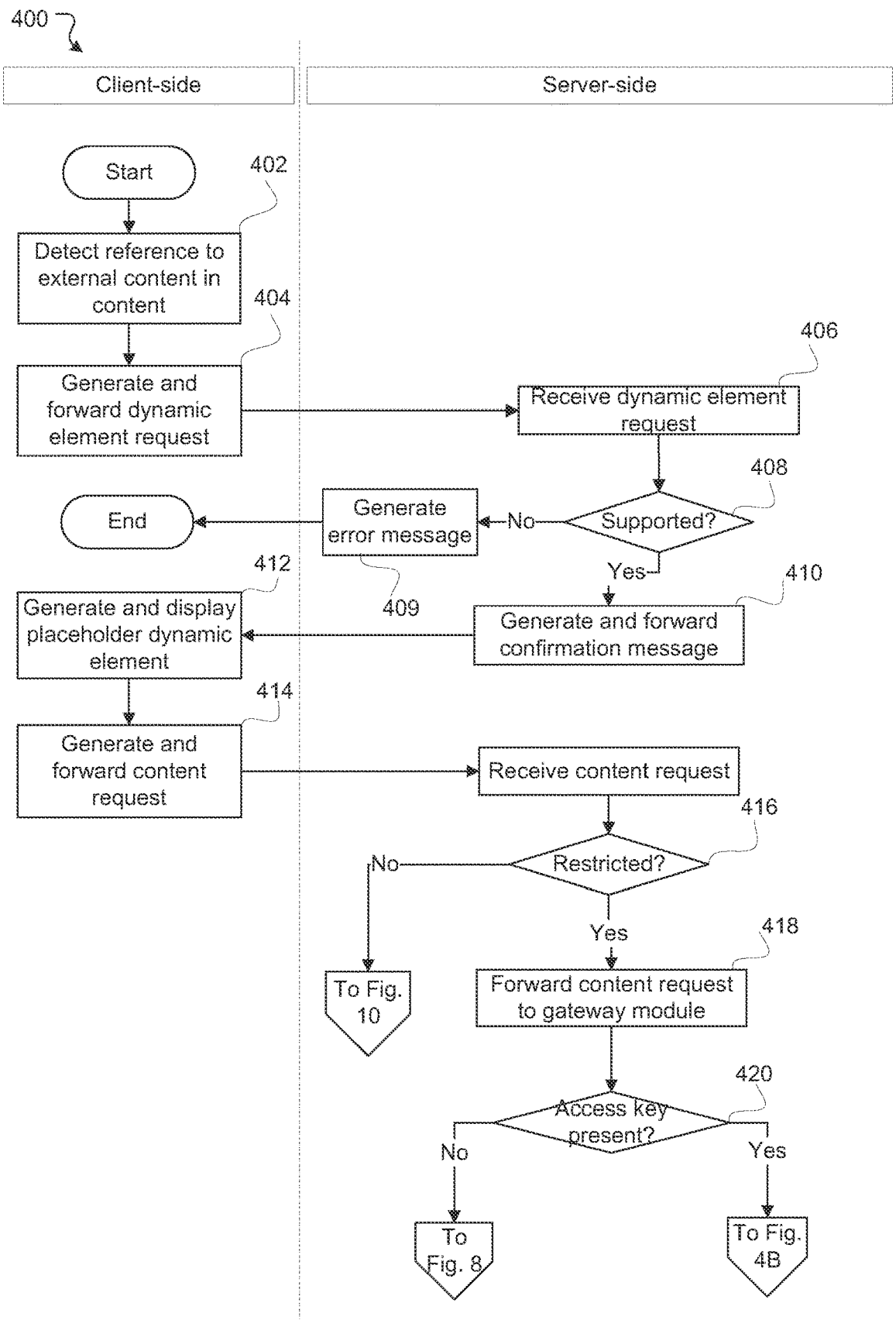
FIGS. 4A-4B depict a flowchart illustrating a method for creating a dynamic element according to some embodiments of the present disclosure.
Figure 4B:
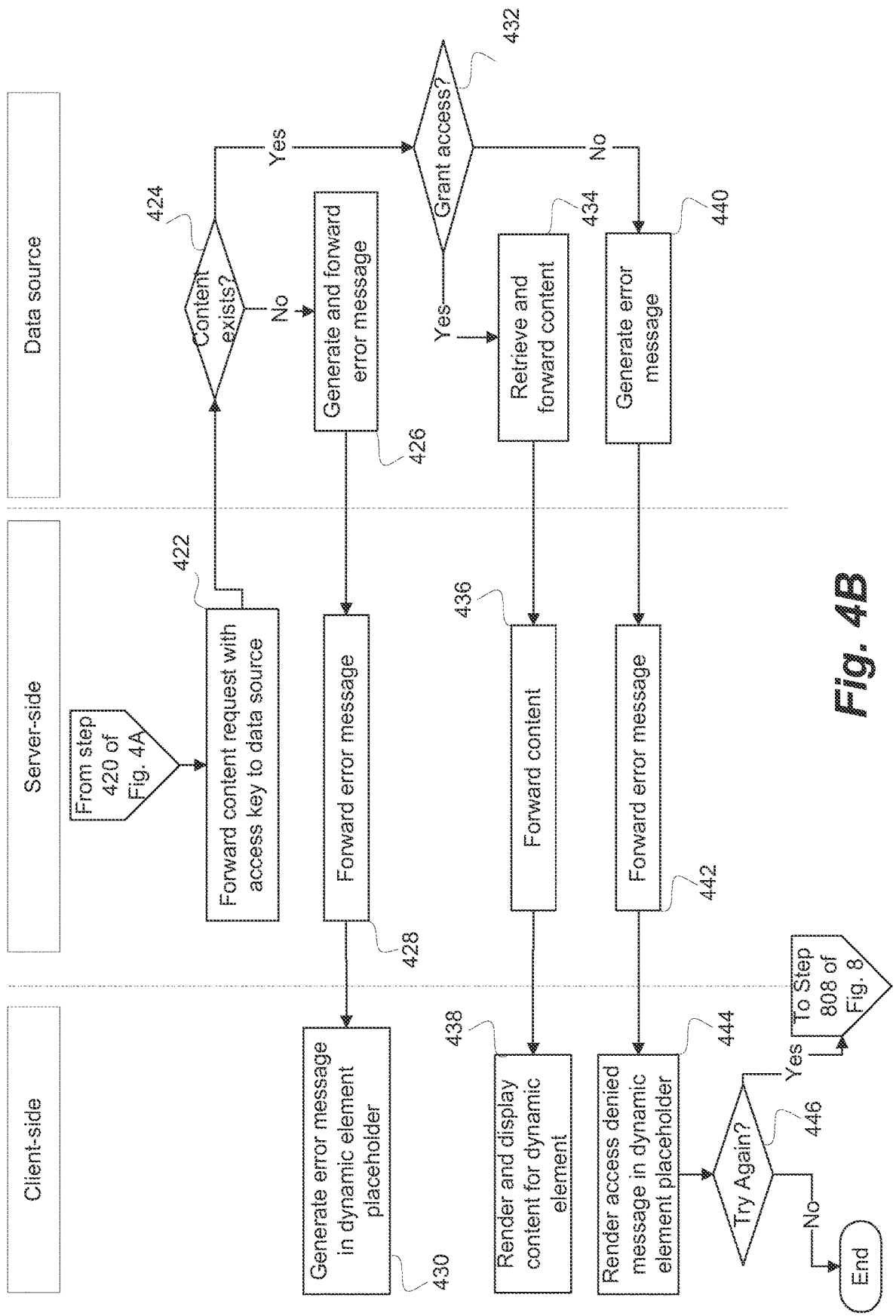

FIGS. 4A-4B illustrate an exemplary method 400 for creating dynamic elements. Although method 400 is described with reference to a single dynamic element, it will be appreciated that in practice this method can be repeated for displaying other dynamic elements as well. In this example, operations of method 400 that are described as being performed by the client device 108 are performed by the client device 108 under control of the content editor 124 and dynamic element client application 126. Similarly, operations of method 400 described as being performed by server-side components are performed by the various sub-systems and modules of the DEMS 102 and the sub-systems of the authentication platform 103, and operations described as being performed by the data source 106 are performed by the API module 130 of the data source 106 and/or the translation module 212 (if present).

The method begins at step 402, where the client device 108 detects a reference to an external data source in content that is currently rendered on the display of the client device 108. This detection can occur when a user is creating content (e.g., when the user is using content editor 124) and it can happen in a number of different ways. In one example, a user may be in the middle of creating content via the content editor 124 and may insert/type a URL or hyperlink in the content editor 124. The content editor 124 detects the URL, which invokes the dynamic element creation process. In another example, the content editor 124 may include a graphical interactive element such as an icon or button to invoke the dynamic element creation process. In this case, the user may type/insert the URL and select the graphical element to initiate the process.

Once the client device 108 detects a reference to an external data source, it generates a dynamic element request at step 404. Initially, this request may include the identified reference (e.g., the URL). Once generated, the request is forwarded to the DEMS 102.

At step 406, the DEMS and in particular the object resolver 202 receives the dynamic element request. The job of the object resolver 202 is to resolve the URL—i.e., retrieve content associated with the URL from the data source 106. To do this, the object resolver 202 first determines whether the DEMS 102 supports the data source associated with the URL. This is done at step 408.

In one example, the object resolver 202 parses the URL to identify a domain name present in the URL. It is well understood that URLs typically follow a standard syntax including a root or top level domain name (e.g., www.example.com), which can sometimes be followed by subdomain names, etc. Accordingly, any known techniques may be utilized to identify the domain name within the received URL. The object resolver 202 also retrieves descriptors of data sources maintained in the data sources registry 204 at this step. It then compares the identified domain name of the particular URL with the 'domain name' field of the retrieved data source descriptors.

If the identifier domain name does not match the domain names of one or more data source descriptors, the object resolver 202 determines that the URL belongs to a data source 106 that is not supported by the DEMS 102. In this case, the method proceeds to step 409, where the object resolver 202 generates an error message (e.g., a 'false' output) and forwards it to the client device 108 and the method ends. The content editor may simply continue to display the original hyperlink and/or display an error message informing the user that the system is unable to retrieve data items from the URL.

Alternatively, if at step 408, the identified domain name matches the domain name of one of the data source descriptors, the object resolver 202 determines that the URL belongs to a data source 106 that is supported by the DEMS 102. In this case, the method proceeds to step 410, where the object resolver 202 generates a confirmation message (e.g., a 'true' output) and forwards the confirmation to the client device 108. The confirmation message is generated to inform the client device 108 that the URL is resolvable and the object resolver 202 will proceed to try and resolve the URL.

Figure 5:
FIG. 5 is an example dynamic element placeholder according to some embodiments of the present disclosure.

At the client device 108, once the confirmation message is received, the dynamic element client application 126 generates a dynamic element placeholder and renders it for display on the client device 108 at step 412. This improves user experience as the user understands that the DEMS 102 is performing tasks in the background to resolve the URL and has not simply crashed/stopped working. In one embodiment, instead of or in addition to displaying the placeholder, the dynamic element client application may generate and render an animated graphical control element such as a spinning hour glass, throbber, spinning wheel, etc. indicating that the DEMS 102 is attempting to retrieve data items from the URL FIG. 5 illustrates an example dynamic element placeholder 500 that is generated and rendered on the client device display 312 at this step.

Returning to FIG. 4A, in response to receiving confirmation that the URL is supported by the DEMS 102, the dynamic element client application 126 also generates a content request for the dynamic element and forwards this request to the DEMS 102 at step 414. This request includes the URL that needs to be resolved and some information to help the DEMS 102 to identify the user that generated the content request. In some cases, this information may be a user ID. In other cases, this information may be a session token (e.g., a cookie) associated with the particular user which can be converted by a proxy service (not shown) located between the client device 108 and the object resolver 202 into a user ID of the user associated with the session token.

Upon receiving the content request and the user ID (which may be included as part of the content request or not), the object resolver 202 determines whether the data source is a public data source or a restricted data source (at step 416). This determination is made because the processes for retrieving content from a public data source and a restricted data source are different. To retrieve content from a public data source, the DEMS 102 does not need to communicate with the authentication platform 103 and/or perform an authentication/authorization check, whereas this is needed in case content is required from a restricted resource.

In one embodiment, the object resolver 202 determines whether the data source is a public data source or a restricted data source by performing a lookup in the descriptor of the data source (e.g., looking up the 'restricted content flag' field in the descriptor) identified at step 408. If the restricted content flag is not activated, the object resolver 202 determines that the data source is a public data source. Conversely, if the restricted content flag is activated in the descriptor, the object resolver 202 determines that the data source is a restricted data source.

If, at step 416, a determination is made that the data source is public, method 1000 is activated. Alternatively, if a determination is made that the data source is restricted, the object resolver 202, requests the gateway module 206 to retrieve content from the associated data source at step 418. This request may include the URL for which content is requested, the user identifier, and the data source identifier of the corresponding data source (retrieved from the data source registry 204).

At step 420, the gateway module 206 determines if any access keys are available for the particular pair of user identifier and data source identifier received from the object resolver 202. In certain embodiments, to do this, the gateway module 206 provides the user identifier and data source identifier to the authorization module 208, which checks if any access keys are available for this pair of identifiers.

In other embodiments, the authorization module 208 may not be aware of data source identifiers, but instead may store access keys against container IDs for data sources. In such cases, instead of providing the data source ID to the authorization module 208, the gateway module 206 retrieves a container ID corresponding to the data source ID from the data source registry 204 and forwards this container ID along with the user ID to the authorization module 208, which checks if any access keys are available in the container associated with that container ID for the provided user ID.

If an access key is found, it is returned to the gateway module 206. Otherwise, the authorization module 208 may inform the gateway module 206 that no access keys exist for that pair of user/data source identifiers.

Accordingly, if it is determined at step 420 that access keys are not available, method 800 is activated. Alternatively, if it is determined at step 420 that access keys are available, the method proceeds to step 422 where the gateway module 206 generates and forwards a content request to the data source 106 or the translation module 212. This request includes the URL for which content is required and the available access key. In one example, the gateway module 206 may use an HTML POST message to forward the request to the data source and Table A illustrates an example body of the POST message.

TABLE A

Example content request message

```
{
  "_meta": {
    "tokens": [
      { "token": "USER ACCESS TOKEN" },
    ]
  },
  "body": {
    "resourceUrl": "https://url.to.be/resolved"
  }
}
```

Typically, a translation module 212 or data source 106 may provide a particular endpoint for servicing content requests for dynamic elements. This endpoint, also referred to as a resolve URL, is available in the data source's descriptor stored in the data source registry 204. The gateway module 206 retrieves the resolve URL from the data source registry 204 and forwards the content request to the endpoint corresponding to the resolve URL. If the resolve URL points to the translation module 212, the translation module 212 forwards the request to the data source at this step.

At step 424, as depicted in FIG. 4B, the data source 106 determines whether content for that URL is still available (e.g., whether the content has been removed and/or whether the content has been deleted). If the content has been deleted, an error message is generated and forwarded back to the gateway module 206 (either directly or via the translation module 212) at step 426.

Figure 6:
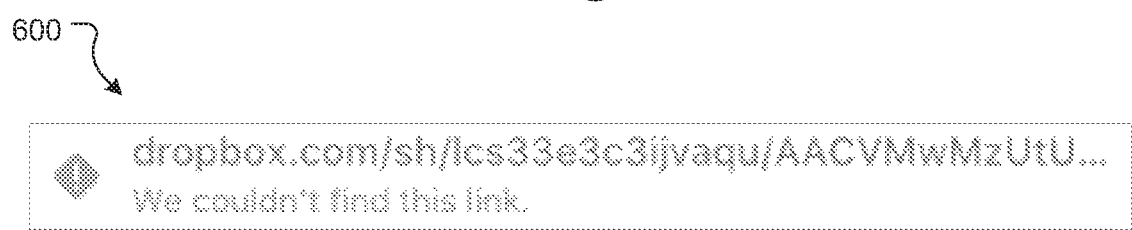
FIG. 6 is an example dynamic element placeholder according to some embodiments of the present disclosure.

This error message is routed back to the object resolver 202 and the dynamic element client application 126 at step 428. The client application 126 in turn displays an error message in the dynamic element placeholder at step 430 informing the user that the link cannot be found. FIG. 6 illustrates an example dynamic element placeholder 600 with the error message.

Returning to FIG. 4B, if at step 424, it is determined that content for that URL is still available, the data source 106 determines whether access should be granted to the content (at step 432). In a particular embodiment, the data source 106 checks if the access key present in the content request is sufficient to grant access to the corresponding URL.

As described previously, the data source 106 maintains a permissions database 128 that includes access keys and corresponding permissions associated with those access keys. Accordingly, at this step, the data source 106 compares the received access key with the access keys stored in its permission database 128 (and their associated permissions) to determine whether the DEMS 102 has permission to view/retrieve this particular content. If the permission corresponding to the received access key is sufficient to grant access to the content of the URL, the data source 106 determines that access should be granted at step 432 and the method proceeds to step 434 where the data source 106 forwards content associated with the URL to the gateway module 206.

If the data source 106 stores its data in the format suitable for the DEMS 102, the data source 106 may simply create a metadata file and forward it to the gateway module 206 at this step.

On the other hand, if the data source does not store its data in the format required by the DEMS 102, the data source 106 communicates with translation module 212 at this step to forward metadata about the URL to the DEMS 102. In certain embodiments, the translation module 212 may receive an initial set of data from the data source and generate a metadata file (e.g., a JSON-LD file) from this data. If the initial set of data is not sufficient to create the metadata file (e.g., because information pertaining to certain fields is not provided in the initial set of data), the translation module 212 may query the data source one or more times to retrieve further data to prepare the metadata file. Once the translation module 212 has received sufficient information about the URL from the data source 106, the translation module 212 may package the metadata, e.g., in the JSON-LD file, and forward the metadata file to the gateway module 206.

Table B illustrates an example of a JSON-LD formatted structured response for a particular Confluence page.

TABLE B example JSON-LD metadata

```
{
  "meta": {
    "visibility": "restricted",
    "access": "granted"
  },
  "data": {
    "@context": "https://www.w3.org/ns/activitystreams",
    "@type": "Document",
    "name": "[name of the document]",
    "context": {
      "type": "Application",
      "name": "Confluence"
    },
    "attributedTo": {
      "type": "Person",
      "name": "[Person name]"
    },
    "image": {
      "type": "Image",
      "url": "[URL for the image]"
    },
    "summary":
      "A proposed approach for representing objects that get rendered into dynamic elements",
    "published": "2017-03-05T12:12:12Z",
    "updated": "2017-03-05T12:12:12Z",
    "url": "[URL for the webpage]"
  }
}
```

In this example, the metadata includes:
Meta.Visibility: this field indicates the visibility status of the resource. Options include public (i.e. visible to user, no authorization required), restricted (authorization is required), not found (i.e., the object does not exist), or forbidden (i.e., the user does not have permissions to see the resource).
Meta.access: this field indicates the current access level to a restricted resource. Options include: unauthorized (i.e., not accessible without authentication), forbidden (not accessible to the user even after authentication), or granted (i.e., access granted)
@Context: this field provides context for the information provided in the "data" section. For example, it may point to a webpage which provides definitions for the fields used in the "data" section.
@Type: this field indicates the type of content available at the URL. In this example, the Confluence page is classified as a 'document'. In other cases, e.g., if the URL hosts a video, the type can be 'video' and if the URL hosts a source code repository, the type can be 'repository' and so on.
Name: this field indicates what the content is—i.e., its name or title.

Context: this field indicates the data source associated with the content and can further include the fields 'type' which indicates what the data source is and 'name' which indicates the name of the data source. In this example, the type is an application and the name of the data source is Confluence.

Attributed to: this includes details about the author of the URL, including the type of the author (e.g., whether it is a person, a team, an organization) and a name of the author (e.g., name of the person, the team or the organization).

Image: this field includes a URL for any images present on the webpage or any images that the data source would like to be displayed in the dynamic element.

Summary this field includes a short blurb about the content of the URL.

Published: indicates when the content on the URL was first published.

Updated: indicates when the webpage was last updated.

URL: includes the URL for the webpage

It will be appreciated that these fields are merely exemplary and depending on the type of data hosted on a data source, the fields may vary slightly or drastically from the fields illustrated in the example above. For example, in case the URL points to a repository, the metadata may include information such as last pull request, last commit, person who made the last commit, last updated, etc. Similarly, in case the URL points to a page on an issue tracking system, the metadata may include information such as number of tickets remaining, number of tickets completed, percentage completed, status, last updated, number of comments, creation date, etc.

Returning to FIG. 4B, once the gateway module 206 receives content from the data source (at step 434) it forwards this to the object resolver 202, which in turn forwards the data to the dynamic element client application 126 at step 436.

The dynamic element client application 126 in turn renders content for the dynamic element placeholder and displays the content in the dynamic element placeholder (at step 438).

The information displayed in the dynamic element and the particular way in which the information is displayed may vary depending on the types of information being displayed, the data source, and/or the operating system of the device on which the client application is operating. For example, if multiple metadata fields and corresponding values are retrieved from the data source, the dynamic element placeholder may be replaced by a graphical control element such as a drop-down list or a list box that allows a user to choose one metadata field or data item from the retrieved content. Alternatively, if a single metadata field and/or corresponding value is retrieved from the data source, the dynamic element placeholder may be replaced by the value of the retrieved metadata field.

In some embodiments, the dynamic element client 126 may be aware of the context around the dynamic element (e.g., by analyzing the content around the dynamic element) and in these cases, the dynamic element client 126 may be configured to select one or more metadata fields for displaying in the dynamic element based on the identified context. For example, if the URL was originally inserted in a spreadsheet cell in the column titled '# of remaining tickets', the dynamic element client 126 may be configured to display the value associated with the metadata field '# of remaining tickets' from the retrieved data. In some examples, if the dynamic element client 126 is not able to identify one metadata field that exactly matches the identified context around the dynamic element, the dynamic element client 126 may be configured to display multiple metadata fields (e.g., via a graphical control element).

Once a user selects a metadata field from the graphical control element or the dynamic element client 126 automatically identifies the metadata field to be displayed in the dynamic element placeholder, the dynamic element client 126 retrieves the corresponding data value and renders it in the dynamic element placeholder. This selection of a particular metadata field may be saved e.g., by the product platform on which the content is being created along with the other content on the page when the dynamic element is first created. Thereafter, whenever the page including that dynamic element is accessed, no metadata field choice is provided to the user, instead, the real time value corresponding to the selected metadata field is directly displayed in the dynamic element.

The dynamic element client 126 may display the value corresponding to the metadata field in a number of different ways. In certain embodiments, Once a metadata field is selected (either by a user or automatically) the dynamic element client determines the 'type' of the metadata field (e.g., from the '@Type' field in the retrieved JSON LD file). It may then determine the most suitable manner to display/render that type of metadata field value. For example, if the selected item is an image, the dynamic element client 126 may render an iframe in which the image is displayed. In another example, if the selected item is a number, it may be displayed in-line with the remainder of the text. Alternatively if the selected item includes multiple underlying number values, the dynamic element client 126 may display the numbers as plain text or as a graph. It will be appreciated that other ways for rendering the selected metadata item may be contemplated including, e.g., in a video player, as a chart, etc., without departing from the scope of the present disclosure.

In some embodiments, the dynamic element may be hyperlinked to the original URL. For instance, when the value of the selected metadata field is rendered in the dynamic element, the value may be automatically hyperlinked to the location of the original URL. This way, a user can access the external data source from where the value is retrieved (if desired).

Figure 7:
FIG. 7 is an example dynamic element placeholder according to some embodiments of the present disclosure.

Returning to step 432, if the permission corresponding to the received access key is not sufficient to grant access to the content of the URL (e.g., because the user does not have access to the particular resource), the data source 106 determines that access should not be granted at step 432 and the method proceeds to step 440 where the data source 106 generates and forwards a message to the gateway module 206 informing the gateway module 206 that the user does not have access to the resource. This message is routed back via the object resolver 202 to the client device 108 at step 442. Upon receiving the message (at step 444), the dynamic element client application 126 generates an error message in the dynamic element placeholder informing the user that access to the resource is forbidden. In certain embodiments, the error message may notify the user that the user's current account is not authorized to access the resource and the user can try to connect via a different user account. FIG. 7 illustrates an example dynamic element placeholder 800 indicating that the resource is forbidden and/or that the user does not have sufficient permissions to access the underlying URL and that the user can try a different account.

If the user decides to try a different account, the user selects this option from the dynamic element at step 446 and the method proceeds to step 808 of method 800 (which will be described later on).

In case the user does not wish to access the data source with another user account (at step 446) or if that option is not provided, the dynamic element placeholder may subsequently be replaced by the original text URL. Alternatively, the dynamic element placeholder with the error message may remain displayed. If the user is in the process of creating content, the user may choose to delete the text URL and/or the dynamic element placeholder.

The process so far describes the situation where the DEMS 102 has permission to retrieve restricted content on behalf of a user. However, as described previously, in some cases, the DEMS 102 may not have the required permissions. In this case, the DEMS 102 is configured to initiate and guide the user through an authorization and authentication process to obtain an access key.

Figure 8:
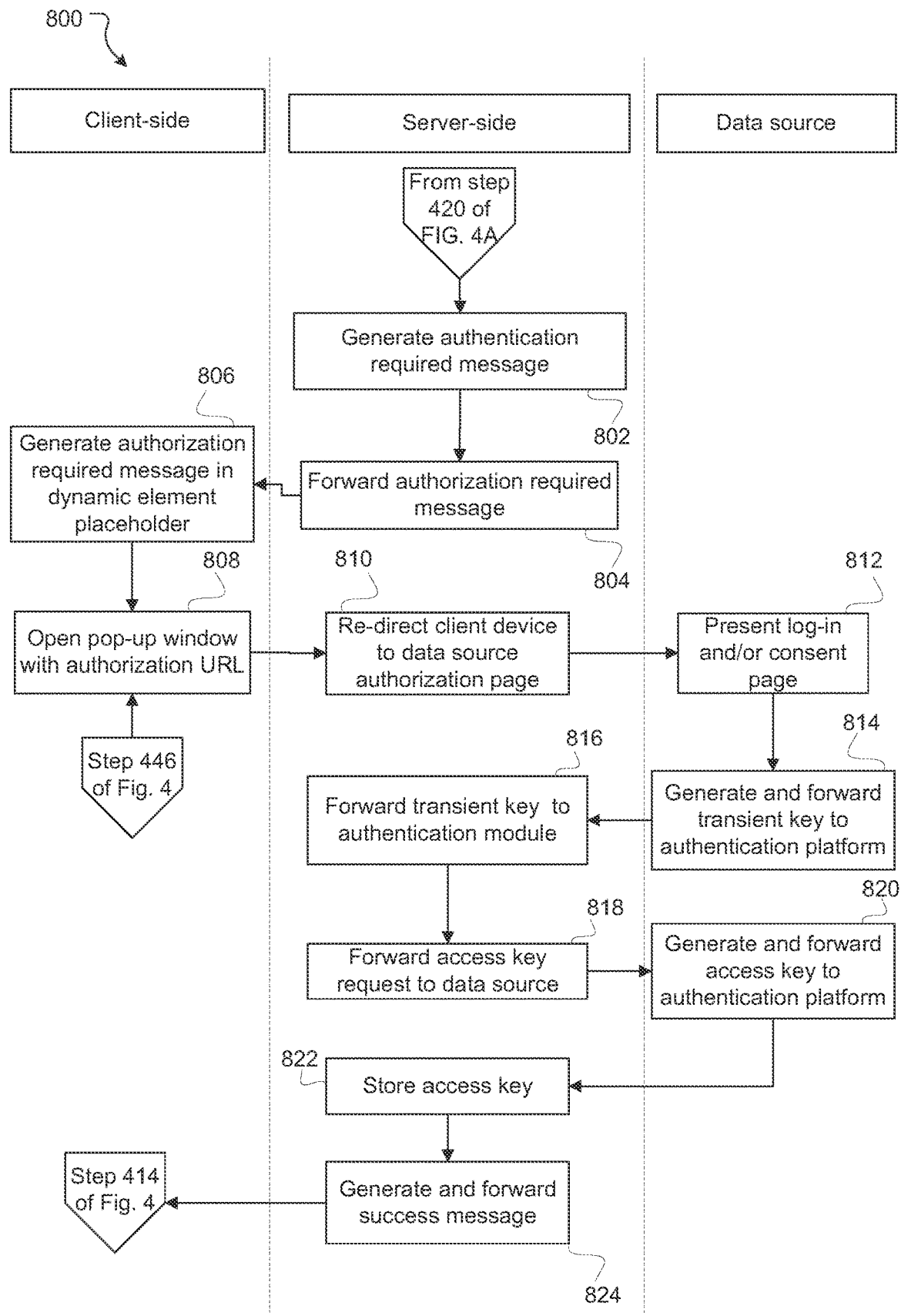
FIG. 8 is a flowchart illustrating a method for creating a dynamic element when authorization is required according to some embodiments of the present disclosure.

This process is described with reference to FIG. 8. In particular, the process depicted in FIG. 8 illustrates the process performed after step 420 of method 400, when the gateway module 206 cannot find any access keys associated with the user and data source pair.

Figure 9:
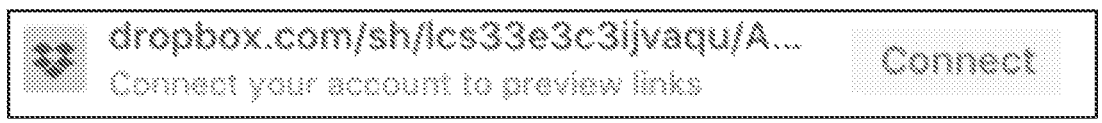
FIG. 9 is an example dynamic element placeholder according to some embodiments of the present disclosure.

The method begins at step 802, where the gateway module 206 generates and forwards a message to the object resolver 202 that indicates that authorization is required to access the content identified by the URL. This message is then forwarded by the object resolver 202 to the client device 108 at step 804. Next (at step 806), the dynamic element client application 126 updates the dynamic element placeholder to inform the user that the resource is restricted and the user has to authorize DEMS 102 to retrieve content on behalf of the user. In one example, the dynamic element placeholder may be updated as shown in FIG. 9 along with an interactive graphical element requesting the user to connect with the data source 106. This interactive graphical element points to the authorization flow module 210.

If the user decides to proceed (i.e., connect with the data source 106), the dynamic element client 126 and the authorization flow module 210 may commence an authorization process. In certain embodiments, this authorization process is based on the OAuth 2.0 standard.

Accordingly, at step 808, when the dynamic element client 126 detects that the user has selected the interactive graphical element to connect with the data source, the dynamic element client 126 opens a pop-up window (at step 808). The opening of the pop-up window starts the authorization flow module 210 of the DEMS 102, which initiates the authorization process with the data source 106. In particular, at step 810, the authorization flow module 210 redirects the client device 108 to the data source's user login and/or authorization service.

In order to redirect the client device 108 to the data source's authorization service, the authorization flow module 210 needs to know at least the authorization URL (i.e., the address of the data source's authorization service) and the client ID of the DEMS 102. This information is stored in the authorization module 208. Accordingly, at this step, the authorization flow module 210 requests the authorization module 208 to send it the authorization URL and the client ID of the DEMS 102 for that particular data source 106. The authorization module 208 retrieves this information from the container associated with that particular data source and forwards the information to the authorization flow module 210. Once the authorization flow module 210 has this information it provides the client ID to the data source's authorization service and redirects the client device 108 to an authorization page hosted by the authorization server (at the location pointed by the authorization URL).

If the user is not already logged in, the user may enter their log-in details (to log into the data source 106) via the authorization page at step 812. Once the user is logged in or if the user is already logged in, the authorization web page directs the user to a consent page where the user is advised that the DEMS 102 would like to access the user's data source account to view and retrieve content from the data source that the user has access to. The user may then accept or decline to provide consent.

If the user is logged in and provides their consent (at step 812), the authorization service of the data source 106 generates and forwards a transient key (e.g., one time password/code/token valid for 60 seconds) to the authorization flow module 210 at step 814 and redirects the client device back to the authorization flow module 210. The authorization flow module 210 in turn forwards this transient key to the authorization module 208 at step 816.

Next (at 818), the authorization module 208 generates an access key request to forward to the data source 106. The access key request includes the transient key received from the data source's authorization service and the client ID.

Upon receiving the access key request, if the authorization service of the data source determines that the client ID and transient key are valid, it generates an access key corresponding to the user and requesting entity (i.e., the DEMS 102) and forwards this access key back to the authorization module 208 at step 820.

In turn, the authorization module 208 stores the access key against a particular user identifier and data source identifier at step 822 and forwards a success message to the authorization flow module 210. In embodiments where the authorization module 208 maintains containers for each data source, the access key is stored in the container corresponding to that particular data source against the user ID of the user that commenced the authorization process.

Once the access key is stored, the authorization flow module 210 generates and forwards an authentication success message to the dynamic element client (at step 824), which closes the pop-up window. Thereafter, the method 800 proceeds to step 414 of method 400, i.e., the client device generate and forwards a content request to the DEMS 102.

As described in detail with respect to FIGS. 4A-4B, the request is then channeled from the object resolver 202 to the gateway module 206. The gateway module 206 retrieves the newly added access key for the user and the data source from the authorization module 208 and forwards this access key along with the URL for which content is requested to the data source 106. The data source determines whether the user is allowed to access the restricted source based on the received access keys and if it is determined that access should be granted, the data source 106 responds with the content (e.g., the metadata associated with the resolved URL).

The method depicted in FIG. 8 and described above assumes that the user provides the correct login details and consents to authorizing the DEMS 102. In case the user login details are incorrect or the user does not consent, the authorization service of the data source 106 does not generate and forward the short duration identifier at step 832. Instead, it ends the authorization process by generating an error message, which is forwarded to the authorization flow module 210. The authorization flow module 210 in turn may display an error message in the pop-up window informing the client that the authorization process has failed. The pop-up window in this case may close and the dynamic element placeholder may display the error message shown in FIG. 7 or FIG. 9.

The process so far describes the situation where the external content is restricted and not publically available. However, in some cases, users may wish to reference external content that is publically available (e.g., a Wikipedia page, the current stock exchange prices, a company website, etc.). In such cases, a simpler process may be adopted to retrieve content from the data source 106, without involvement of the authentication platform 103.

Figure 10:
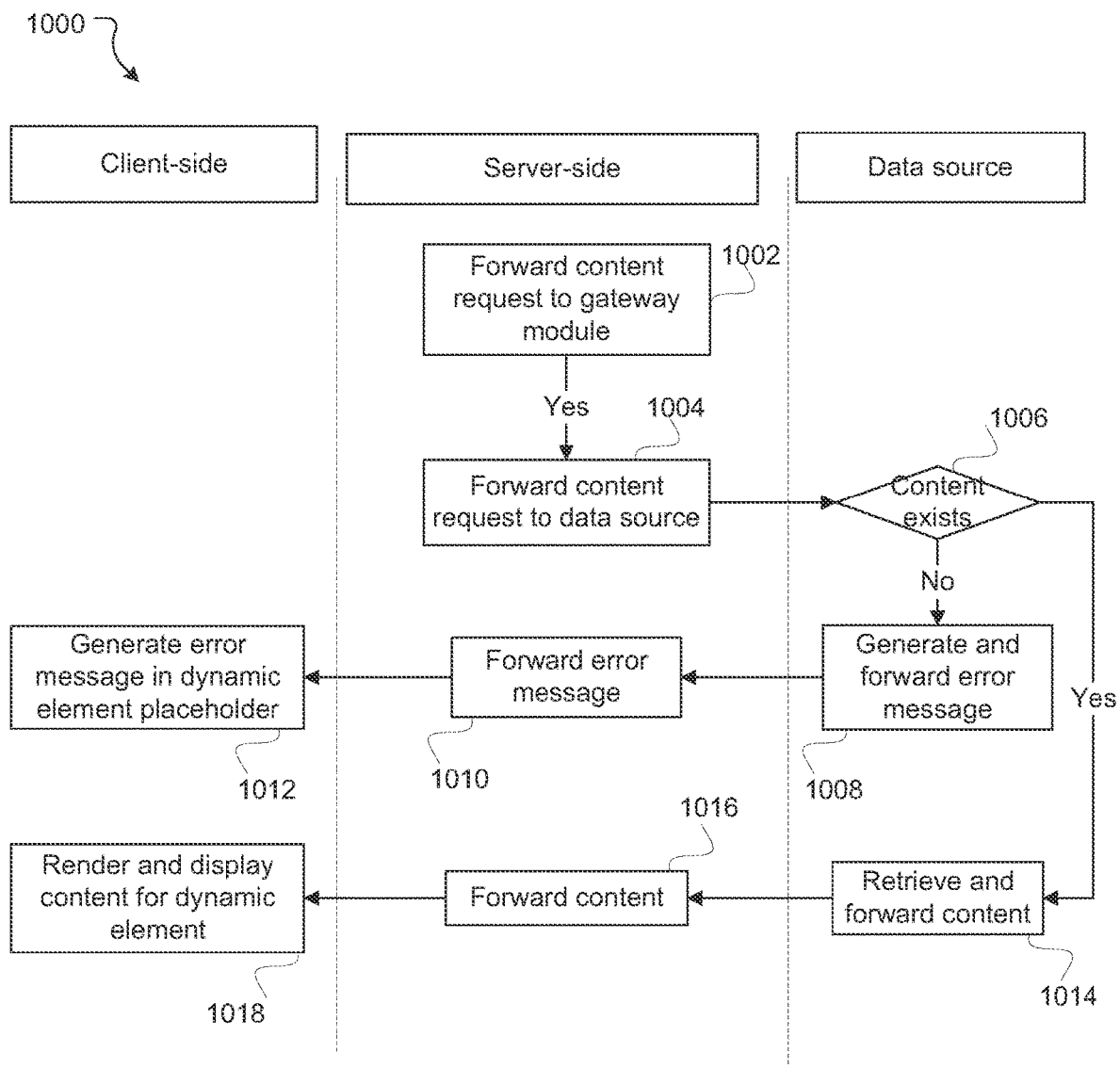
FIG. 10 is a flowchart illustrating an example method for creating a public dynamic element according to some embodiments of the present disclosure.

This process is described with reference to FIG. 10. In particular, the process depicted in FIG. 10 illustrates the process performed after step 416 of method 400, when the object resolver 202 determines that the URL is a public resource.

At step 1002, the DEMS 102 and in particular the object resolver 202, requests the gateway module 206 to retrieve content from the associated data source. This request may include the URL for which content is requested and the data source identifier of the corresponding data source (retrieved from the data source registry 204).

At step 1004, the gateway module 206 generates and forwards a content request to the data source 106. This request includes the URL for which content is required. In one example, the gateway module 206 may use an HTML POST message to forward the request to the data source 106 and Table C illustrates an example body of the POST message.

TABLE C example content request message

```
{
  "body": {
    "resoureUrl": "https://url.to.be/resolved"
  }
}
```

As described previously, a data source 106 may provide a particular endpoint for servicing content requests for dynamic elements. This endpoint, also referred to as a resolve URL, is stored in the data source's descriptor in the data source registry 204. The gateway module 206 retrieves the resolve URL and forwards the content request to the endpoint corresponding to the resolve URL (which may point to the translation module 212 or an API of the data source).

At step 1006, the data source 106 determines whether content for the URL exists (e.g., whether the content has been removed and/or whether the content has been deleted). If the content has been deleted, an error message is generated and forwarded back to the gateway module 206 at step 1008.

This error message is routed back to the object resolver 202 and the dynamic element client 126 at step 1010. The client application 126 in turn displays an error message in the dynamic element placeholder at step 1012 informing the user that the link cannot be found.

If at step 1006, it is determined that the content for the URL exists, the data source 106 retrieves the requested content and forwards this to the gateway module 206 at step 1014. This step is similar to step 432 to FIG. 4B and therefore is not described in detail here.

Once the gateway module 206 receives content from the data source (at step 1016) it forwards this to the object resolver 202, which in turn forwards the data to the dynamic element client 126.

The dynamic element client 126 in turn renders content for the dynamic element placeholder and displays the content in the dynamic element placeholder (at step 1018). Again, this step is similar to step 438 of FIG. 4B and is therefore not described in any more detail here.

Method 400 describes the process for displaying a dynamic element when a user enters/types/pastes a URL in the content editor 124. When a user views content via client application 120, which already includes one or more dynamic elements, the process is slightly different. In this case, the content already includes dynamic element placeholders within the content. Whenever a portion of the content that includes a dynamic element is rendered on the display of the client device, the dynamic element client 126 generates a content request for the rendered dynamic element placeholder (similar to step 414 of FIG. 4A). Thereafter the method steps for displaying the dynamic element is the same as that described with reference to FIGS. 4A-10. Accordingly, when a user views content that includes dynamic elements, the process for displaying dynamic elements starts at step 414 and steps 402-412 are omitted.

In some embodiments, as the dynamic element client 126 already knows the specific metadata field(s) meant to be displayed in the dynamic element, the dynamic element 126 may generate a specific dynamic element request for that metadata field. In this case, instead of retrieving all the available metadata from the underlying URL, the DEMS 102 may retrieve only the metadata field(s) required in the dynamic element.

By using a two layer architecture in the DEMS (i.e., an object resolver 202 that is configured to communicate with the client device 108 and a gateway module 206 that is configured to communicate with the data sources 106 and/or translation modules 212), the DEMS 102 provides security. This is because the access keys are never shared with the object resolver 202 or the client device 108. Instead, the access keys are only ever shared between the gateway module 206 and the authorization module 208. Further, the object resolver 202 does not have direct access to the authorization module 208 and therefore cannot access the access keys stored in that authorization module. This way, even if a client application 120 is hacked, it is difficult for the client application 120 to retrieve access keys or other confidential information stored on the DEMS 102.

Further, the dynamic elements are generated in real time whenever the user views a page containing external referenced content. This way, the data depicted in the dynamic element is always up to date.

The methods 400, 800 and 1000 are described for dynamic elements that are refreshed every time they are rendered on a particular user device. However, as described previously, in some cases, when the dynamic element is created (e.g., when the value corresponding to the selected metadata field is rendered in the dynamic element), the dynamic element client 126 may display an option to freeze the rendered value of the dynamic element such that the value is not refreshed each time the dynamic element is rendered. In this case, once the user selects the freezing option, the value may be converted into plain text and embedded along with the remaining content on the page such that none of the methods described above are activated when the page containing that information is rendered in the future.

In some embodiments, the option for freezing the value of the dynamic element may only be offered when the URL corresponding to the dynamic element is a publically available URL.

The methods described above clearly distinguish between the functionality of the server-side components (i.e., the DEMS 102 and the authentication platform 103) and client-side components of the dynamic element management system. However, in some cases, some of the functions that are described as being performed by the dynamic element client 126 may be performed by the DEMS 102 vice versa. For example, in some cases, the dynamic element client may be a thin client configured to only send requests and render dynamic elements. In this case the functionality of converting the metadata file into graphical control objects may be performed at the server and the server may send data to render the visual objects to the client. In other cases, the dynamic element client 126 may be configured to determine whether the data source is supported by the dynamic element management system by directly querying the data source registry itself. In this case, one or more of the steps 404-409 may either be omitted or performed by the dynamic element client 126.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A method for providing linked content in an electronic document in a first platform, the method comprising:
   subsequent to a successful authentication of a user of a client device with respect to the first platform, causing display of a graphical user interface of the first platform on the client device, the graphical user interface depicting at least a portion of the electronic document which includes document content within the first platform;
   receiving a request, within a content creation area of the first platform, to render a dynamic element, the dynamic element having a region having linked content that is linked to external content provided by an external data source;
   in response to the request, causing display of a graphical object within the content creation area, the dynamic element linked to external data provided by a second platform;
   in response to a successful authentication of the user with respect to the second platform, causing the graphical object to be replaced by dynamic element including at least a portion of the external content obtained from the second platform; and
   subsequent to a change in the external content managed by the external data source, causing an updated display of at least a portion of the external content, the updated display corresponding to the change in external content from the external data source.

2. The method of claim 1, comprising:
   in response to a failure of an authentication of the user with respect to the external data source, causing display of a placeholder graphical element within the electronic document, the placeholder graphical element suppressing display of the external content.

3. The method of claim 1, wherein:
   the first platform is a content collaboration platform; and
   the dynamic element includes metadata extracted from the external content managed by the external data source.

4. The method of claim 1, comprising:
   subsequent to receiving the request to render the dynamic element, causing display of a prompt requesting user credentials for the external data source.

5. The method of claim 4, wherein:
   the user credentials include a token generated by the external data source; and
   the token is associated with a user of the client device.

6. The method of claim 1, wherein:
   the external data source is an issue tracking system; and
   the external content associated with the dynamic element is related to a ticket managed by the issue tracking system.

7. The method of claim 1, wherein the dynamic element is a table.

8. A method for displaying a dynamic element having external content in an electronic document in a first platform, the method comprising:
   subsequent to a successful authentication of a user with respect to the first platform, causing display of a graphical user interface of the first platform on a client device of the user, the graphical user interface depicting at least a portion of the electronic document which includes document content within the first platform;
   detecting, within a content creation region, a graphical object corresponding to a dynamic element embedded in the electronic document, the dynamic element including external data from a second platform;
   subsequent to a successful authentication of the user with respect to the second platform, causing the graphical object to be replaced with the dynamic element within the content creation region, the dynamic element including at least a portion of the external data from the second platform; and
   subsequent to a change in the external content on the second platform, causing an updated display of the at least the portion of the external content, the updated display corresponding to the change in external content from the second platform.

9. The method of claim 8, comprising:
in response to a failed authentication of the user with respect to the second platform, causing display of a placeholder graphical element within dynamic element, the placeholder graphical element displaying a message that the external data is restricted.

10. The method of claim 8, wherein:
the dynamic element includes metadata extracted from the second platform; and
the metadata corresponds to at least one of a title of the external content, a status of the electronic document, or a timestamp.

11. The method of claim 8, wherein:
the electronic document is a first electronic document;
the external content is a second electronic document;
the dynamic element includes at least one user-selectable region; and
in response to a user selection of the at least one user-selectable region, at least a portion of the second electronic document is displayed.

12. The method of claim 8, wherein the first platform is a content collaboration platform.

13. The method of claim 12, wherein:
the second platform is an issue tracking platform; and
the dynamic element includes metadata having ticket information.

14. The method of claim 8, wherein:
in response to the change in external content being a change in a location of the external content, the updated display includes an error message.

15. A method for displaying external data from a restricted platform, the method comprising:
in accordance with a successful authentication of a user with respect to a first platform, causing display of an electronic document within the first platform;
in response to a user request, within a content creation area of the first platform, to generate a dynamic element, causing display of a graphical object within the content creation area, the dynamic element linked to external data provided by a second platform;
retrieving an authentication credential specific to the user for the second platform; and
in response to a successful authentication of an authentication credential with respect to the second platform, causing the graphical object to be replaced with the dynamic element, the dynamic element including the at least a portion of the external data provided by the second platform.

16. The method of claim 15, comprising:
in response to a failed authentication of the user with respect to the second platform, causing display of a placeholder graphical element within the dynamic element, the placeholder graphical element having a control operable to connect to the second platform.

17. The method of claim 15, wherein the content creation area includes content creation control configured to allow the user to generate the user request.

18. The method of claim 15, wherein the external data is linked via a uniform resource locator (URL) of the second platform.

19. The method of claim 15, wherein the external data is updated using an application programming interface (API) call provided from the first platform to the second platform.

20. The method of claim 15, wherein the second platform is a content collaboration platform.

* * * * *